US012351442B2

(12) United States Patent
Itozawa et al.

(10) Patent No.: US 12,351,442 B2
(45) Date of Patent: Jul. 8, 2025

(54) CONVEYANCE APPARATUS

(71) Applicant: TOYOTA JIDOSHA KABUSHIKI KAISHA, Toyota (JP)

(72) Inventors: Yuta Itozawa, Nagoya (JP); Kunihiro Iwamoto, Nagakute (JP); Hirotaka Komura, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 292 days.

(21) Appl. No.: 18/161,376

(22) Filed: Jan. 30, 2023

(65) Prior Publication Data

US 2023/0242387 A1 Aug. 3, 2023

(30) Foreign Application Priority Data

Feb. 2, 2022 (JP) ................................. 2022-014646

(51) Int. Cl.
*B66F 9/18* (2006.01)

(52) U.S. Cl.
CPC ...................................... *B66F 9/18* (2013.01)

(58) Field of Classification Search
CPC ................................ B65G 1/0435; B66F 9/18
See application file for complete search history.

(56) References Cited

U.S. PATENT DOCUMENTS

| | | | | |
|---|---|---|---|---|
| 10,913,641 | B2 * | 2/2021 | Gravelle | B66F 9/122 |
| 11,414,312 | B2 * | 8/2022 | Nobata | B65G 1/0407 |
| 11,485,575 | B2 * | 11/2022 | Dooley | B66F 7/0625 |
| 12,049,359 | B2 * | 7/2024 | Dooley | B66F 7/0666 |

FOREIGN PATENT DOCUMENTS

| | | | |
|---|---|---|---|
| JP | 63-013908 | U | 1/1988 |
| JP | 5-286522 | A | 11/1993 |
| JP | 6-144509 | A | 5/1994 |
| JP | 07-069453 | A | 3/1995 |
| JP | 11-029207 | A | 2/1999 |
| JP | 11-59815 | A | 3/1999 |

* cited by examiner

*Primary Examiner* — Mark C Hageman
(74) *Attorney, Agent, or Firm* — Sughrue Mion, PLLC

(57) ABSTRACT

A conveyance apparatus capable of easily moving an object without the need for a precise alignment control for engaging an arm thereof with the object is provided. The conveyance apparatus includes: an arm that is movable in a horizontal direction; and a control unit configured to control a movement of the arm, in which the arm includes a ratchet claw, and the control unit moves the arm along a surface of an object, the surface including an engagement part.

8 Claims, 16 Drawing Sheets

CONVEYANCE APPARATUS

CROSS REFERENCE TO RELATED APPLICATIONS

This application is based upon and claims the benefit of priority from Japanese patent application No. 2022-014646, filed on Feb. 2, 2022, the disclosure of which is incorporated herein in its entirety by reference.

BACKGROUND

The present disclosure relates to a conveyance apparatus that conveys an object.

Various types of apparatuses for conveying objects have been developed. For example, Japanese Unexamined Patent Application Publication No. H11-029207 discloses a load transferring device that moves a container between a shelf and a mounting table by engaging a hook provided at the tip of a shaft capable of being extended or retracted from the mounting table with an engagement part formed in the container. This load transferring device extends the shaft so that the hook is positioned below the engagement part of the container and then rotates the shaft to make the hook stand up, thereby hooking the hook to the engagement part.

SUMMARY

In the technology disclosed in Japanese Unexamined Patent Application Publication No. H11-029207, a precise control is required to align the position of the hook with the position of the engagement part and hence it is not easy to engage the hook with the engagement part.

The present disclosure has been made in view of the above-described circumstances and an object thereof is to provide a conveyance apparatus capable of easily moving an object without the need for a precise alignment control for engaging an arm thereof with the object.

A first exemplary aspect for achieving the above-described object is a conveyance apparatus including: an arm that is movable in a horizontal direction; and a control unit configured to control a movement of the arm, in which the arm includes a ratchet claw, and the control unit moves the arm along a surface of an object, the surface including an engagement part.

According to the above-described conveyance apparatus, the ratchet claws are engaged with the engagement part of the object simply by moving the arm. Therefore, it is possible to easily move an object without the need for a precise alignment control for engaging the arm with the object.

In the above-described aspect, the arm comprises a first ratchet claw and a second ratchet claw, one of the first ratchet claw and the second ratchet claw being the ratchet claw, the first ratchet claw of which a claw tip facing a front of the arm, the second ratchet claw of which a claw tip facing a rear of the arm.

According to the above structure, the object is moved in the first direction using the first ratchet claw, while the object is moved in the second direction using the second ratchet claw. Therefore, it is possible to move the object in both the first and the second directions using the arm.

In the above-described aspect, the first ratchet claw and the second ratchet claw may be provided so as to be spaced from each other in a circumferential direction of the arm, and the control unit may rotate the arm in the circumferential direction of the arm.

According to the above structure, the ratchet claws used to move the object can be switched by rotating the arm. Therefore, it is possible to improve the convenience of the conveyance apparatus.

In the above-described aspect, the second ratchet claw may be provided so as to be perpendicular to the first ratchet claw.

According to the above structure, the vertical width of the entire arm including the two ratchet claws can be reduced. Therefore, it is possible to easily insert the arm into a narrow gap.

In the above-described aspect, the conveyance apparatus may further include a placement part, in which the arm may extend from and retract into the placement part in the horizontal direction, and the ratchet claws may be engaged with the engagement part that is formed in a bottom surface of the object.

According to the above structure, the object can be moved to the placement part or moved from the placement part to the outside.

According to the present disclosure, it is possible to provide a conveyance apparatus capable of easily moving an object without the need for a precise alignment control for engaging an arm thereof with the object.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment according to the present disclosure will be described hereinafter with reference to the drawings.

Figure 1:
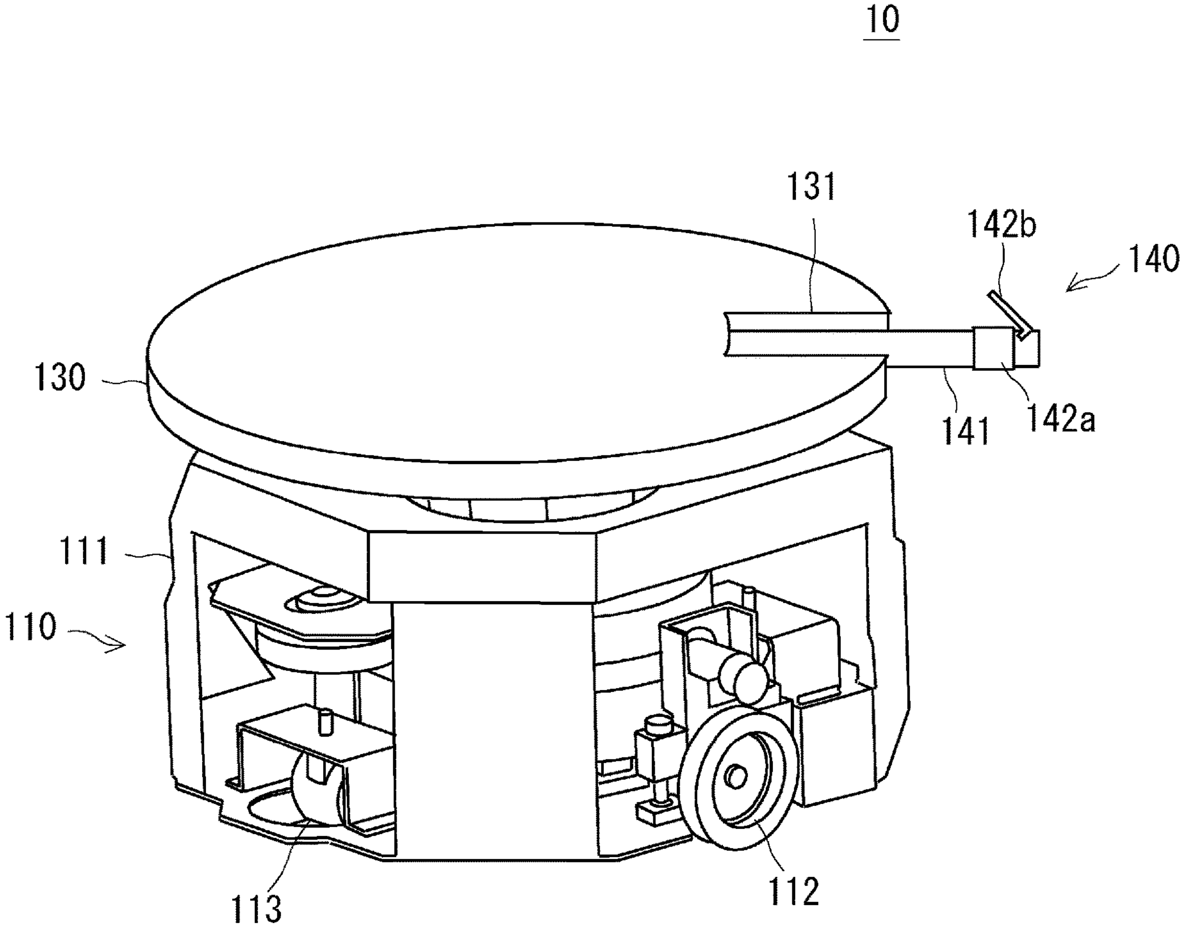
FIG. 1 is a perspective view showing a schematic configuration of an autonomous mobile robot according to an embodiment.
Figure 2:
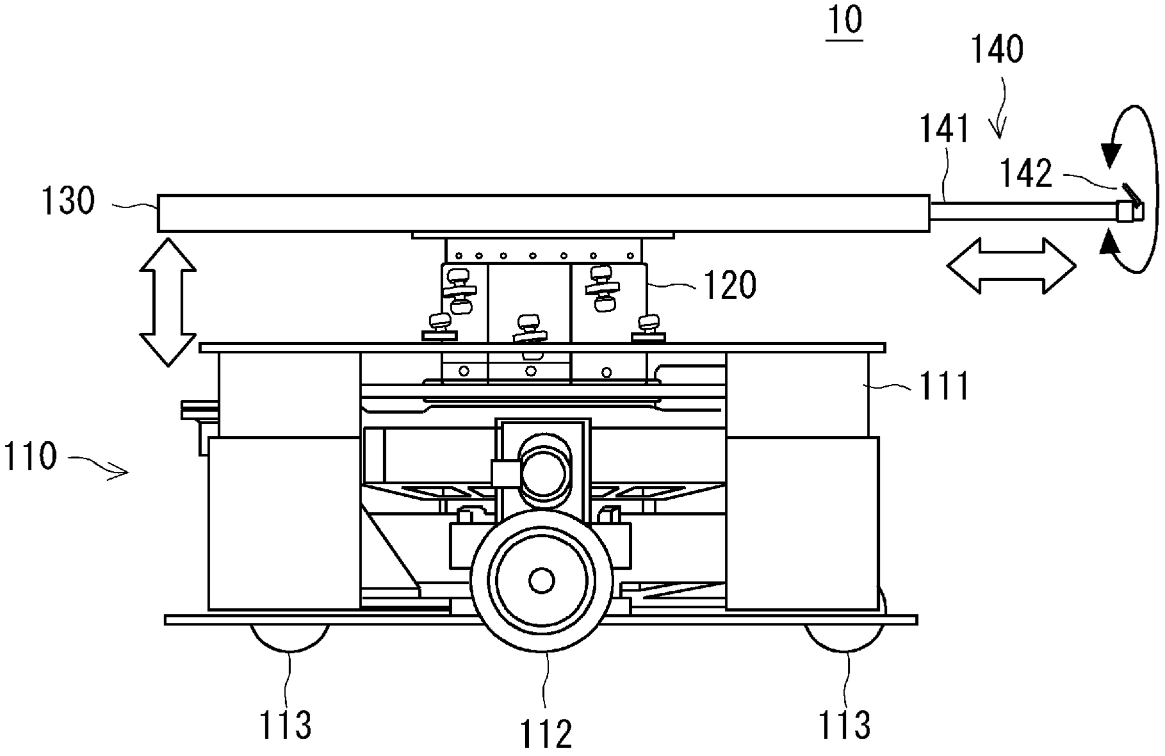
FIG. 2 is a side view showing a schematic configuration of the autonomous mobile robot according to the embodiment.
Figure 3:
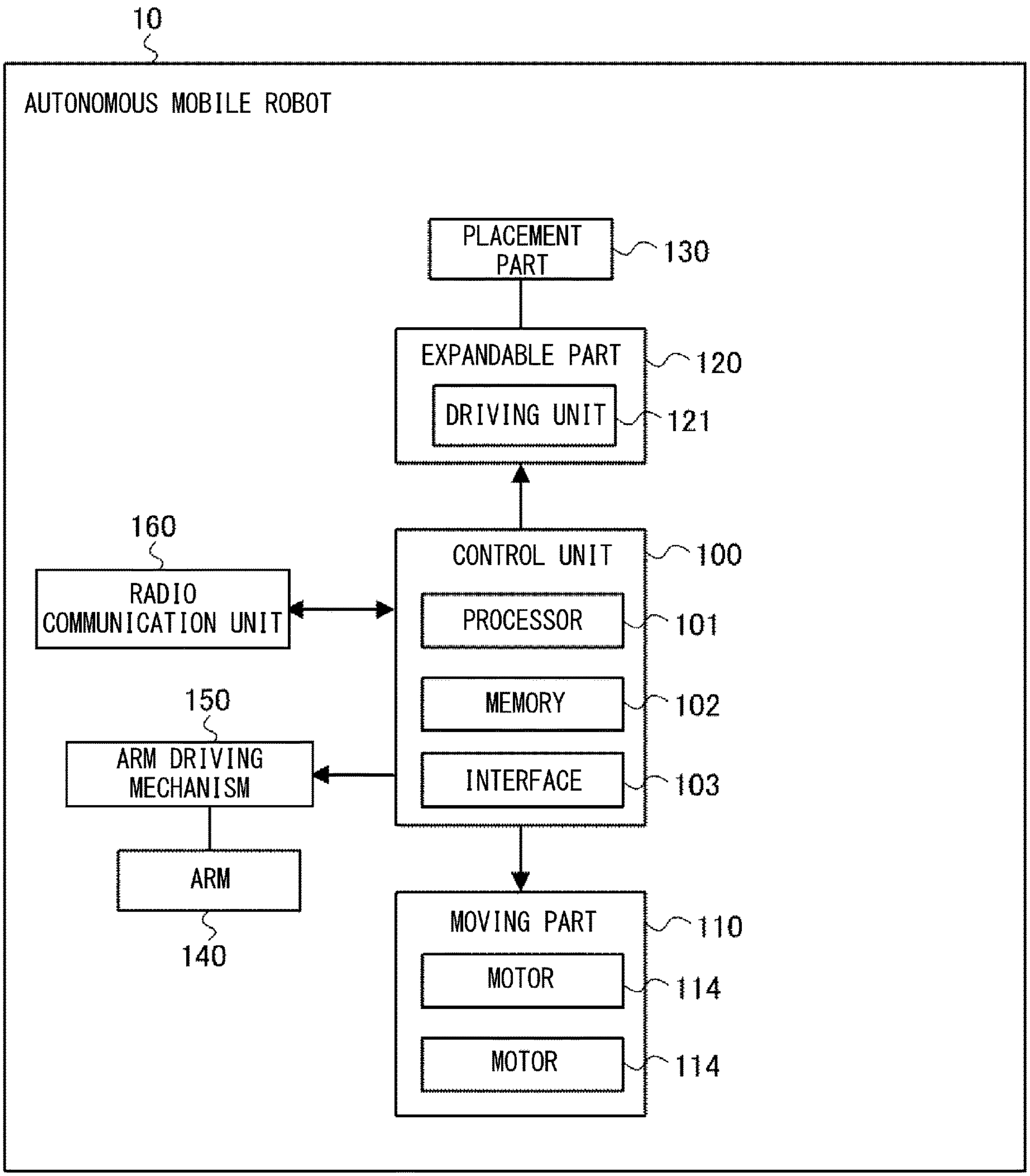
FIG. 3 is a block diagram showing a schematic system configuration of the autonomous mobile robot according to the embodiment.

FIG. 1 is a perspective view showing a schematic configuration of an autonomous mobile robot 10 according to an embodiment. FIG. 2 is a side view showing a schematic configuration of the autonomous mobile robot 10 according to the embodiment. FIG. 3 is a block diagram showing a schematic system configuration of the autonomous mobile robot 10 according to the embodiment.

An autonomous mobile robot 10 according to this embodiment, which is an example of a conveyance apparatus, is a robot that autonomously moves in a moving environment such as in a house, in an institution, in a warehouse, in a factory, or outdoors. The autonomous mobile robot 10 according to this embodiment includes a movable moving part 110, an expandable part 120 that vertically expands/contracts, a placement part 130 by which an object placed thereon is supported, an arm 140, an arm driving mechanism 150, a control unit 100 that controls the autonomous mobile robot 10, i.e., controls the moving part 110, the expandable part 120, the arm 140 and so on, and a radio communication unit 160.

The moving part 110 includes a robot main-body 111, a pair of right and left driving wheels 112 rotatably disposed in the robot main-body 111, a pair of front and rear trailing wheels 113 rotatably disposed in the robot main-body 111, and a pair of motors 114 that rotationally drive the respective driving wheels 112. Each of the motors 114 rotates a respective one of the driving wheels 112 through a speed reducer or the like. Each of the motors 114 rotates a respective one of the driving wheels 112 according to a control signal sent from the control unit 100, thereby enabling the robot main-body 111 to move forward, move backward, and rotate. In this way, the robot main-body 111 can move to an arbitrary place. Note that the above-described configuration of the moving part 110 is merely an example and the configuration of the moving part 110 is not limited to this example. For example, the respective numbers of the driving wheels 112 and the trailing wheels 113 of the moving part 110 may be arbitrary determined, and any configuration may be used as long as it can move the robot main-body 111 to an arbitrary place.

The expandable part 120 is an expanding/contracting mechanism that expands/contracts in the vertical direction. The expandable part 120 may be formed as a telescopic expanding/contracting mechanism. The placement part 130 is provided in the upper-end part of the expandable part 120, and the placement part 130 is raised or lowered by the movement of the expandable part 120. The expandable part 120 includes a driving unit 121 such as a motor, and expands/contracts by the driving of the driving unit 121. That is, the placement part 130 is raised or lowered by the driving of the driving unit 121. The driving unit 121 drives in accordance with a control signal sent from the control unit 100. Note that any known mechanism for controlling the height of the placement part 130 disposed above the robot main-body 111 may be used in place of the expandable part 120 in the autonomous mobile robot 10.

The placement part 130 is disposed in the upper part (at the top) of the expandable part 120. The placement part 130 is raised and lowered by the driving unit 121 such as a motor, and in this embodiment, the placement part 130 is used as a place where an object to be conveyed by the autonomous mobile robot 10 is placed. In order to convey an object, the autonomous mobile robot 10 moves with the object while supporting the object by the placement part 130. In this way, the autonomous mobile robot 10 conveys the object.

The placement part 130 is composed of, for example, a plate member serving as an upper surface and a plate member serving as a lower surface, and has a space for accommodating the arm 140 and the arm driving mechanism 150 between the upper and lower surfaces. In this embodiment, the shape of each of these plate members, that is, the shape of the placement part 130 is, for example, a flat disk-like shape, but may be any other shape. More specifically, in this embodiment, a cut-out part 131 is formed in the placement part 130 along a line along which the arm 140 is moved in order to prevent a ratchet claw 142*a* or a ratchet claw 142*b* of the arm 140 from colliding with the placement part 130 when the arm 140 is moved (see FIGS. 4 and 5). Note that the cut-out part 131 is formed at least in the upper surface of the placement part 130.

In the placement part 130, the arm 140, which extends from and retracts into the placement part 130 in the horizontal direction, is provided. The arm 140 includes a shaft part 141 extending in the horizontal direction, and the ratchet claws 142*a* and 142*b* provided at the tip of the shaft part 141. Note that, in the following description, when the ratchet claws 142*a* and 142*b* are referred to without being distinguished from each other, they are simply referred to as ratchet claws 142. Further, in the placement part 130, the arm driving mechanism 150 for moving the arm 140 in the horizontal direction (in other words, in a direction along the shaft part 141, and in still other words, in the longitudinal direction of the arm 140) and for rotating the shaft part 141 according to a control signal(s) sent from the control unit 100 is provided. The arm driving mechanism 150 includes, for example, a motor(s) and a linear guide(s), and thereby moves the arm 140 in the horizontal direction and rotates the shaft part 141. However, any known mechanism for performing these movements may be used as the arm driving mechanism 150.

As described above, the arm 140 is movable in the horizontal direction (the direction of the shaft part 141 of the arm 140), and the ratchet claw 142 can be rotated by the rotation of the shaft part 141. That is, the ratchet claw 142 can be rotated by using the shaft part 141 as a rotation shaft.

Figure 4:
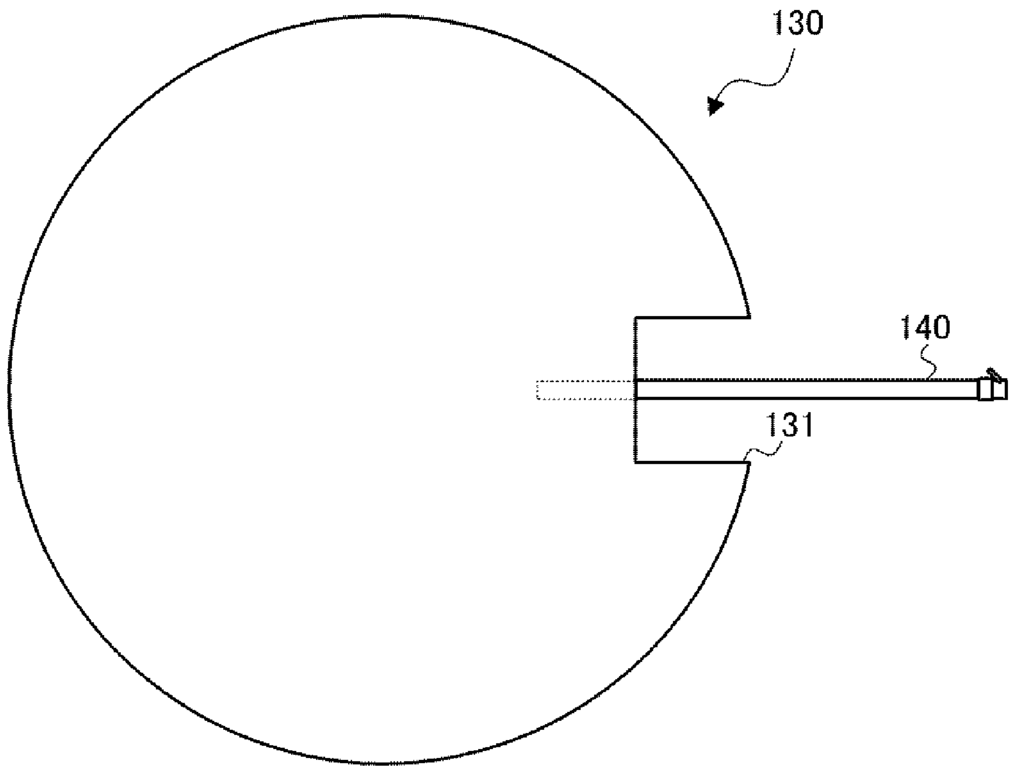
FIG. 4 is a plan view of a placement part in a state in which the tip of an arm protrudes outward in the horizontal direction of the placement part.
Figure 5:
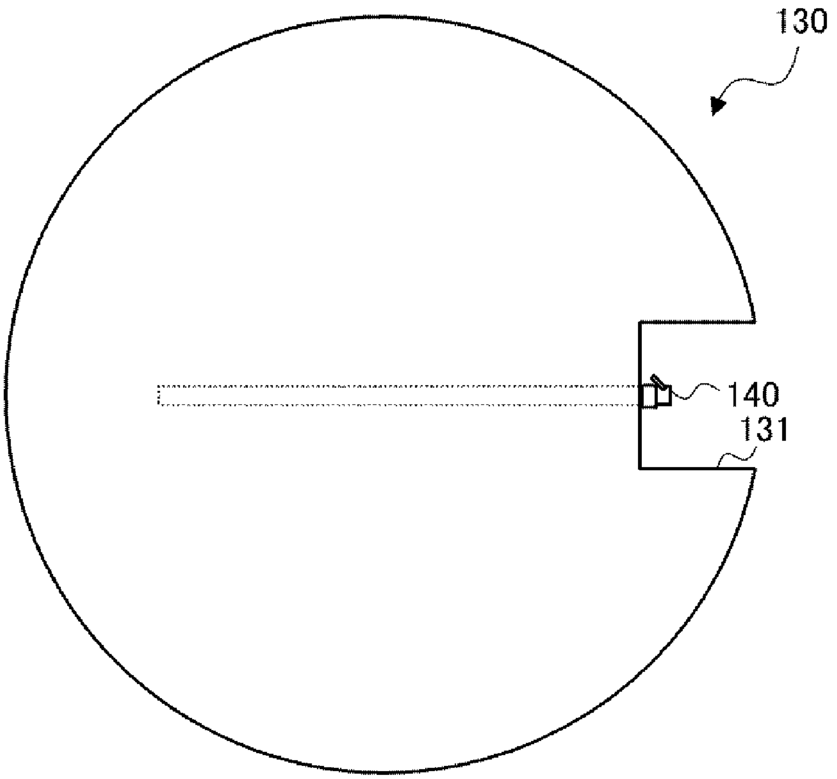
FIG. 5 is a plan view of the placement part in a state in which the tip of the arm is retracted into the placement part.

Here, the horizontal movement of the arm 140 is shown in the drawings. FIG. 4 is a plan view of the placement part 130 in a state in which the tip of the arm 140 protrudes beyond the placement part 130 in the horizontal direction. Further, FIG. 5 is a plan view of the placement part 130 in a state in which the tip of the arm 140 is retracted into the placement part 130. Note that, as shown in the drawing, the cut-out part 131 of the placement part 130 is a cut-out part having a predetermined length, extending from the outer peripheral edge of the placement part 130 along the axis of the arm 140. Specifically, as shown in FIG. 5, the position of the end of the cut-out part 131 corresponds to the position of the tip (the ratchet claw 142) of the arm 140 in the state where the arm 140 is retracted as much as possible to the placement part 130 side. As described above, since the cut-out part 131 is formed in the placement part 130, the ratchet claw 142 of the arm 140 can be retracted to the inside of the outer periphery of the placement part 130.

In this embodiment, the cut-out part 131 is provided, because if it is not provided, when the ratchet claws 142 face upward, the movement of the arm 140 would be interfered with. However, if the movement of the arm 140 would not be interfered with, the cut out part 131 may not be provided.

Figure 6:
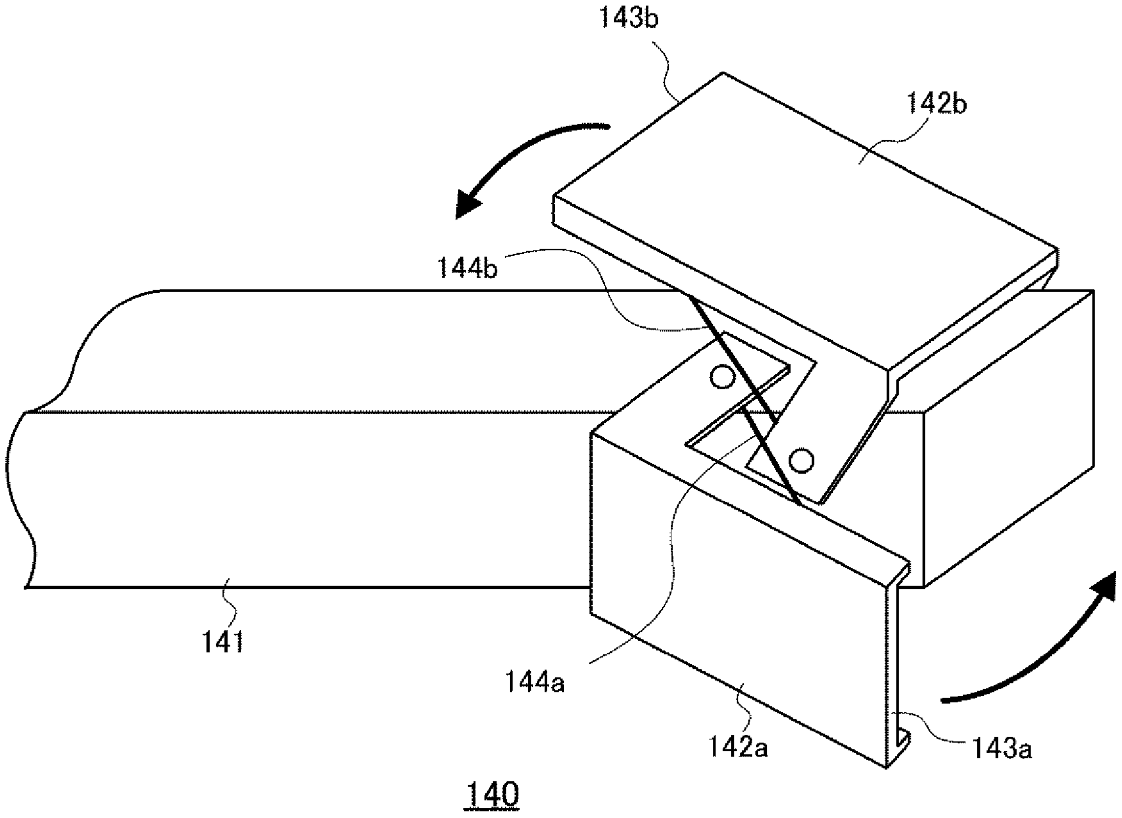
FIG. 6 is a perspective view schematically showing a ratchet claw provided at the tip of the arm.
Figure 7:
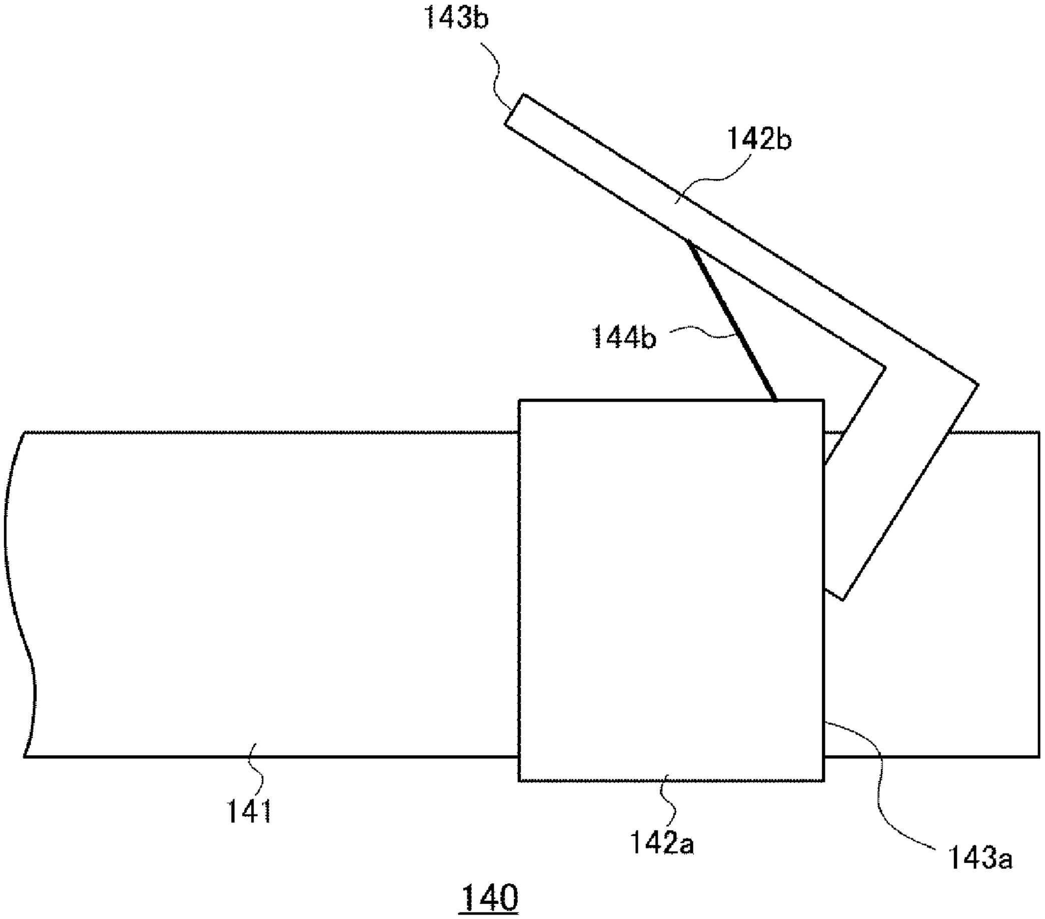
FIG. 7 is a side view schematically showing the ratchet claw provided at the tip of the arm.

The arm 140 includes the ratchet claws 142. The ratchet claws 142 are provided along a direction in which the arm 140 (the shaft part 141) is extended. That is, in a horizontal plane, a direction in which the claw tips of the ratchet claws 142 face is the direction in which the arm 140 (the shaft part 141) is extended. FIG. 6 is a perspective view schematically showing the ratchet claws 142 provided at the tip of the arm 140. Further, FIG. 7 is a side view schematically showing the ratchet claws 142 at the tip of the arm 140. As shown in FIGS. 6 and 7, in this embodiment, more specifically, the arm 140 includes the ratchet claw 142*a* of which a claw tip 143*a* faces the front of the arm 140 (the shaft part 141) and the ratchet claw 142*b* of which a claw tip 143*b* faces the rear of the arm 140 (the shaft part 141). That is, the claw tip 143*a* of the ratchet claw 142*a* faces the front of the arm 140 in the moving direction thereof. Further, the claw tip 143*b* of the ratchet claw 142*b* faces the rear of the arm 140 in the moving direction thereof. The ratchet claws 142 are energized so that the claw tips (the claw tips 143*a* and 143*b*) spring up from the arm 140 (the shaft part 141). In this embodiment, as an example, the ratchet claws are energized so that the claw tips spring up from the arm 140 using energizing members 144*a* and 144*b*. Specifically, the energizing members 144*a* and 144*b* are springs such as torsion springs. Both of the ratchet claws 142*a* and 142*b* are freely rotatable in the directions (indicated by arrows in FIG. 6) in which the claw tips approach the arm 140 (the shaft part 141). However, they can be rotated only up to a predetermined angle in the direction in which the claw tips move away from the arm 140 (the shaft part 141). Specifically, the aforementioned predetermined angle is an angle formed by the claw and the shaft part 141, and is any angle of 90 degrees or smaller. More specifically, the aforementioned predetermined angle is, for example, any angle from 10 degrees or larger to 90 degrees or smaller. The claw tips (the claw tips 143*a* and 143*b*) of the ratchet claws 142 are energized so as to maintain the aforementioned predetermined angle. As described above, the ratchet claws 142 can be freely rotated in a direction opposite to the energizing direction using a shaft perpendicular to the arm 140 (the shaft part 141) as a rotation shaft. However, they can be rotated only up to a predetermined rotation angle in the energizing direction.

As shown in FIGS. 6 and 7, the ratchet claws 142*a* and 142*b* are provided so as to be spaced from each other in the circumferential direction of the arm 140 (the shaft part 141). Therefore, by rotating the arm 140 in the circumferential direction of the arm 140, it is possible to perform switching such that one of the ratchet claw 142*a* and the ratchet claw 142*b* faces the upper part of the arm 140. In this embodiment, more specifically, the ratchet claw 142*b* (the ratchet claw 142*a*) is provided so as to be perpendicular to the ratchet claw 142*a* (the ratchet claw 142*b*). That is, the ratchet claw 142*b* (the ratchet claw 142*a*) is provided 90 degrees away from the ratchet claw 142*a* (the ratchet claw 142*b*) in the circumferential direction.

As described above, in this embodiment, the arm 140 includes the two ratchet claws 142 in which the respective directions in which the claws face are opposite to each other.

Therefore, the object is moved in the first direction using the first ratchet claw, while the object is moved in the second direction using the second ratchet claw. Thus, as described below, it is possible to move the object in both the first and the second directions using the arm 140.

Referring to FIG. 3 again, the description of the structure will be continued.

The radio communication unit 160 is a circuit that performs radio communication in order to communicate with a server or another robot as required, and includes, for example, a radio transmitting/receiving circuit and an antenna. Note that when the autonomous mobile robot 10 does not communicate with other apparatuses, the radio communication unit 160 may be omitted.

The control unit 100 is an apparatus that controls the autonomous mobile robot 10, and includes a processor 101, a memory 102, and an interface 103. The processor 101, the memory 102, and the interface 103 are connected to one another through a data bus or the like.

The interface 103 is an input/output circuit that is used to communicate with other apparatuses such as the moving part 110, the expandable part 120, the arm driving mechanism 150, and the radio communication unit 160.

The memory 102 is formed by, for example, a combination of a volatile memory and a nonvolatile memory. The memory 102 is used to store software (a computer program) including at least one instruction executed by the processor 101, and data used for various types of processing performed in the autonomous mobile robot 10.

The processor 101 loads the software (the computer program) from the memory 102 and executes the loaded software, and by doing so, performs processing performed by the control unit 100 as described later.

The processor 101 may be, for example, a microprocessor, an MPU (Micro Processor Unit), or a CPU (Central Processing Unit). The processor 101 may include a plurality of processors.

As described above, the control unit 100 is an apparatus that functions as a computer.

The program includes instructions (or software codes) that, when loaded into a computer, cause the computer to perform one or more of the functions described in the embodiment. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (Registered Trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Next, processing performed by the control unit 100 will be described.

The control unit 100 controls the movement of the autonomous mobile robot 10. That is, the control unit 100 controls the movements of the moving part 110, the expandable part 120, and the arm 140. The control unit 100 controls the rotation of each of the driving wheels 112 by transmitting a control signal to each of the motors 114 of the moving part 110, and therefore can move the robot main-body 111 to an arbitrary place. Further, the control unit 100 can control the height of the placement part 130 by transmitting a control signal to the driving unit 121 of the expandable part 120. Further, the control unit 100 can control the movement of the arm 140 in the horizontal direction and the rotation of the ratchet claws 142 by transmitting a control signal(s) to the arm driving mechanism 150.

In this way, the control unit 100 controls the linear movement of the ratchet claws 142 in the horizontal direction. In this embodiment, in particular, the control unit 100 moves the arm 140 along the surface of the object, which surface includes the engagement part. Further, by rotating the arm 140 in the circumferential direction of the arm 140, the control unit 100 controls the rotation of the ratchet claws 142 using the shaft part 141 as a rotation shaft.

The control unit 100 may control the movement of the autonomous mobile robot 10 by performing well-known control such as feedback control and robust control based on information about the rotations of the driving wheels 112 detected by a rotation sensor(s) provided in the driving wheels 112. Further, the control unit 100 may make the autonomous mobile robot 10 move autonomously by controlling the moving part 110 based on information such as information about a distance(s) detected by a distance sensor such as a camera or an ultrasonic sensor provided in the autonomous mobile robot 10 and information about a map of the moving environment.

Figure 8:
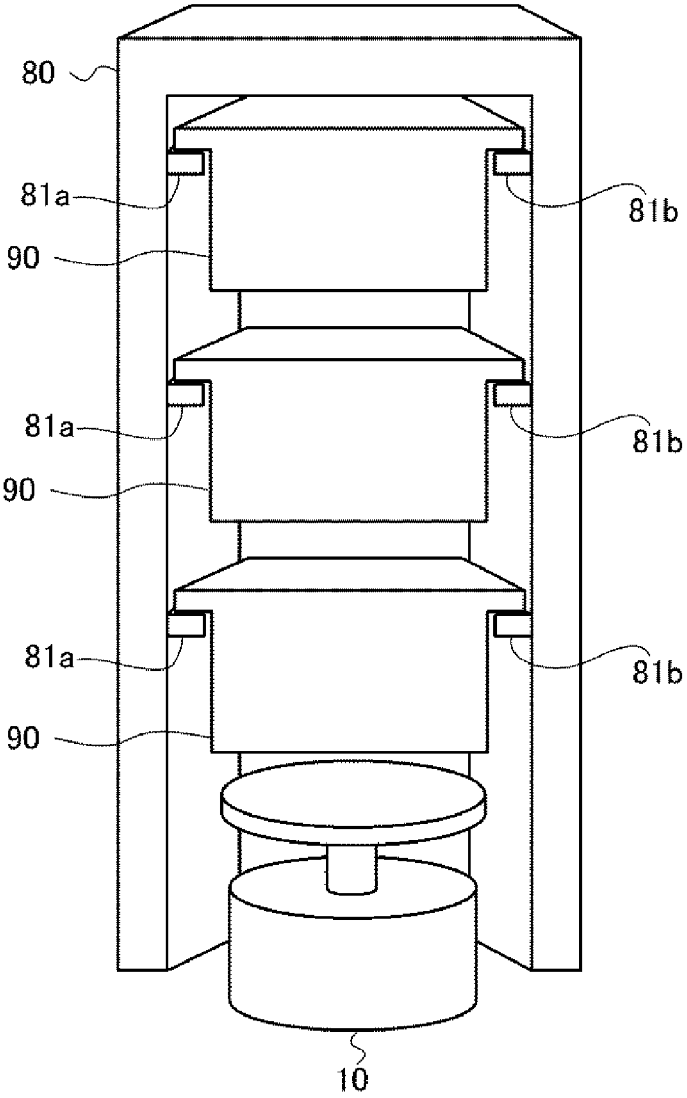
FIG. 8 is a schematic diagram showing a rack and objects to be conveyed, stored in the rack.
Figure 9:
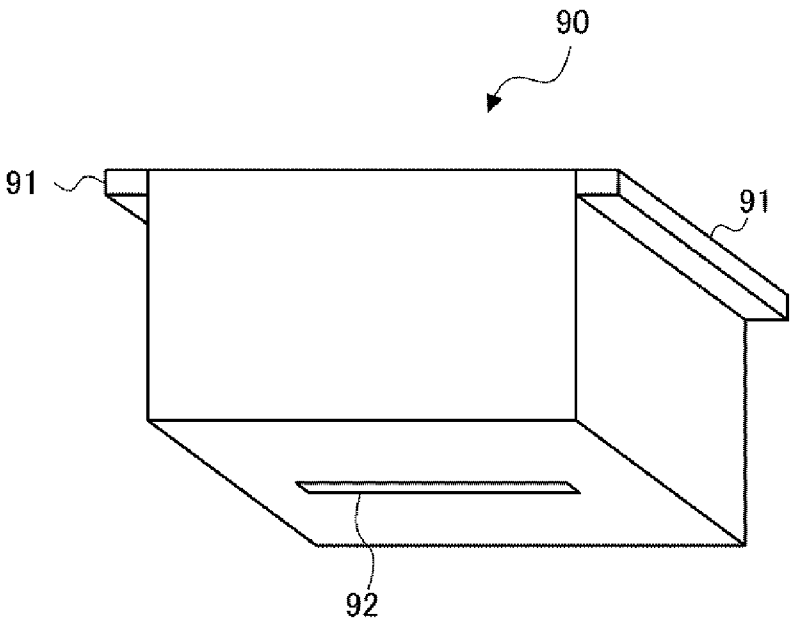
FIG. 9 is a perspective view showing the front, the bottom, and a side of an object.

An object that is conveyed by the autonomous mobile robot 10 will be described hereinafter in detail. FIG. 8 is a schematic diagram showing a rack 80 and objects 90 to be conveyed, stored in the rack 80. Note that, in FIG. 8, the autonomous mobile robot 10, which is positioned in front of the rack 80, is also shown. Further, FIG. 9 is a perspective view showing the front, the bottom, and a side of one of the objects 90. As shown in FIG. 8, the autonomous mobile robot 10 moves to a place close to the rack 80 when it moves the object 90 stored in the rack 80 onto the placement part 130 or when it moves the object 90 placed on the placement part 130 into the rack 80. More specifically, for example, the autonomous mobile robot 10 moves to a place that is located in front of the rack 80 and between a pair of rails 81*a* and 81*b* of the rack 80.

The rack 80 includes the pair of rails 81*a* and 81*b* that support both sides of the object 90. The pair of rails 81*a* and 81*b* are disposed at the same height and are parallel to each other. One of the sides of the object 90 stored in the rack 80 is supported by the rail 81*a*, and the other side thereof is supported by the rail 81*b*. Each of the rails 81*a* and 81*b* extends from the front of the rack 80 to the rear thereof.

For example, as shown in FIG. 9, flanges 91 are provided on both sides of the object 90, and the flanges 91 are supported by the rails 81*a* and 81*b* from underneath thereof, so that the object 90 is supported in the rack 80. Note that the flanges 91 are provided on both sides of the object 90 and extend from the front of the object 90 to the rear thereof. Although the flanges 91 are provided in the upper parts of the object 90 on the sides thereof in the example shown in FIG. 9, they do not necessarily have to be disposed in the upper parts of the object 90 and may be provided, for example, in the lower parts of the object 90. Further, in the case where the bottom surface of the object 90 is supported by the rails 81*a* and 81*b*, the flanges 91 do not necessarily have to be provided in the object 90.

As described above, in the rack 80, both sides of the object 90 are supported from underneath thereof by the rails 81*a* and 81*b*. Further, the object 90 is movable in the forward/backward direction along the rails 81*a* and 81*b* in the rack 80. That is, the object 90 is stored into the rack 80 by pushing the object 90 toward the rear surface of the rack 80. Further, the object 90 can be taken out from the rack 80 by pulling the object 90 toward and beyond the front of the rack 80.

As shown in FIG. 9, an engagement part 92, in which the ratchet claw 142 of the arm 140 is hooked, is formed in a predetermined place in the bottom surface of the object 90. The engagement part 92 may have any structure in which the tip of the ratchet claw 142 can be hooked, and specifically, the engagement part may be a groove or a projection. Further, the projection used as the engagement part 92 may be a rib provided in order to increase the strength of the surface of the object 90. Further, in the example shown in FIG. 9, although one engagement part 92 is formed in the object 90, a plurality of engagement parts 92 arranged in a predetermined direction (the direction of the flange 91, i.e., the direction in which the object 90 is moved in the rack 80) may instead be formed in the surface of the object 90. Note that the object 90 is, for example, a rectangular parallelepiped container (box), but it is not limited to this example and may be any type of an object. Any object can be stored in the object 90 which serves as a container.

By operating the arm 140, the control unit 100 of the autonomous mobile robot 10 moves the object 90 from the rack 80 onto the placement part 130, or moves the object 90 from the placement part 130 into the rack 80. FIGS. 10 to 14 are schematic diagrams showing movements of the object 90 originally stored in the rack 80 through which the object 90 is placed on the placement part 130.

Figure 10:
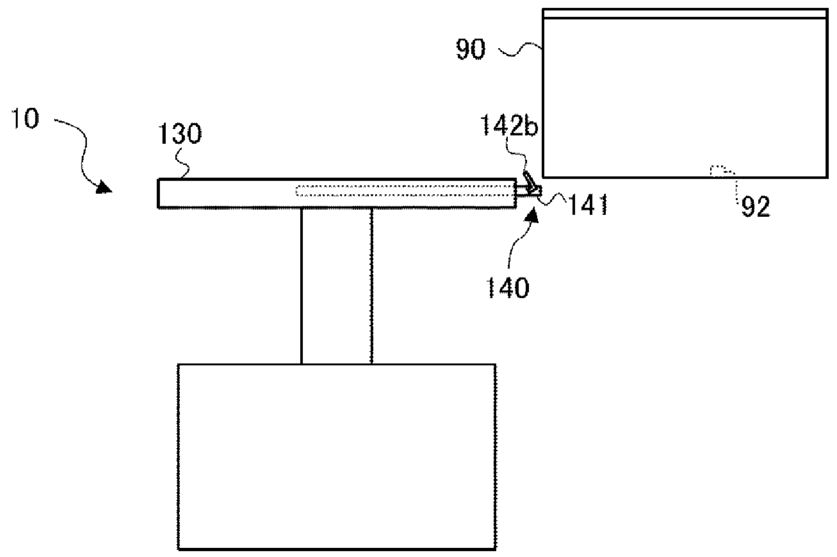
FIG. 10 is a schematic diagram showing a movement of an object originally stored into a rack through which the object is placed on a placement part.

As shown in FIG. 10, the control unit 100 first rotates the shaft part 141 of the arm 140 so that the ratchet claw 142*b*, the claw tip 143*b* of which faces the rear of the arm 140, faces upward. In this way, regarding this embodiment, the ratchet claws 142 used to move the object 90 can be switched by rotating the arm 140. Therefore, switching of the ratchet claws can be performed easily and hence the conveyance apparatus is highly convenient.

Figure 11:
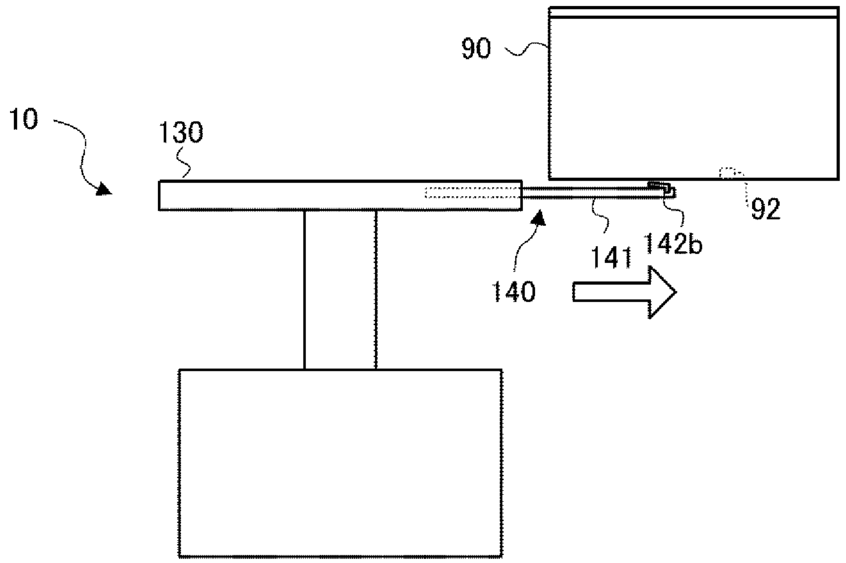
FIG. 11 is a schematic diagram showing the movement of the object originally stored into the rack through which the object is placed on the placement part.
Figure 12:
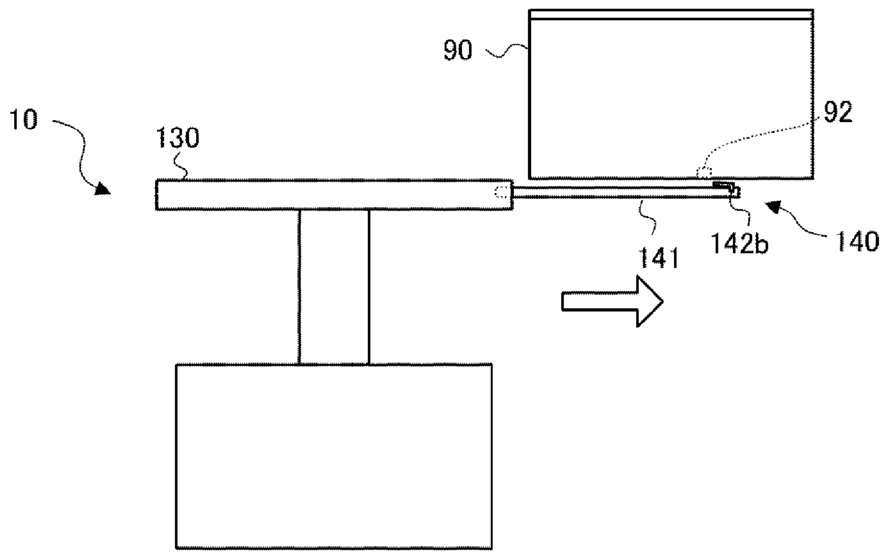
FIG. 12 is a schematic diagram showing the movement of the object originally stored into the rack through which the object is placed on the placement part.

Next, as shown in FIGS. 11 and 12, the control unit 100 extends the arm 140 from the placement part 130 by a predetermined length. Note that, as shown in FIGS. 11 and 12, the claw of the ratchet claw 142*b* is pushed down by the bottom surface of the object 90, and then the ratchet claw 142*b* is moved while being in contact with the bottom surface of the object 90 due to the energization of the energizing member 144*b*. Under the control of the control unit 100, the ratchet claw 142*b* is moved to a position beyond the engagement part 92 on the bottom surface of the object 90 (see FIG. 12).

As described above, the ratchet claws 142*a* and 142*b* are provided 90 degrees away from each other in the circumferential direction. Therefore, while the ratchet claw 142*b* faces upward, the ratchet claw 142*a* faces in the horizontal direction. That is, since the ratchet claw 142*a* does not face downward, the vertical width of the entire arm 140 including the two ratchet claws 142 can be reduced. Therefore, it is possible to easily insert the arm 140 into a narrow gap. That is, it is possible to easily insert the arm 140 into a narrow space present on the bottom side of the object 90 to be conveyed (e.g., a narrow gap between the object 90 to be conveyed and another object 90 stored one level below the object 90 to be conveyed).

Figure 13:
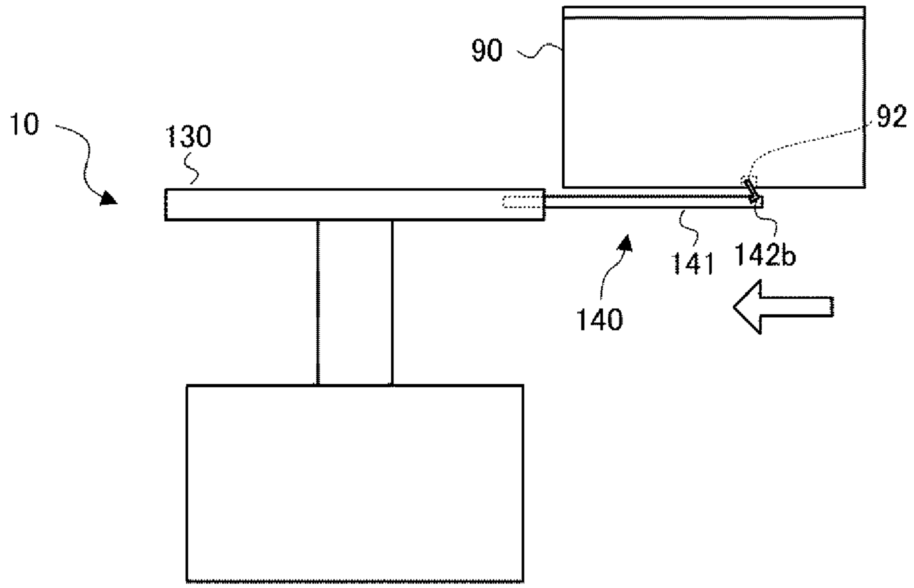
FIG. 13 is a schematic diagram showing the movement of the object originally stored into the rack through which the object is placed on the placement part.
Figure 14:
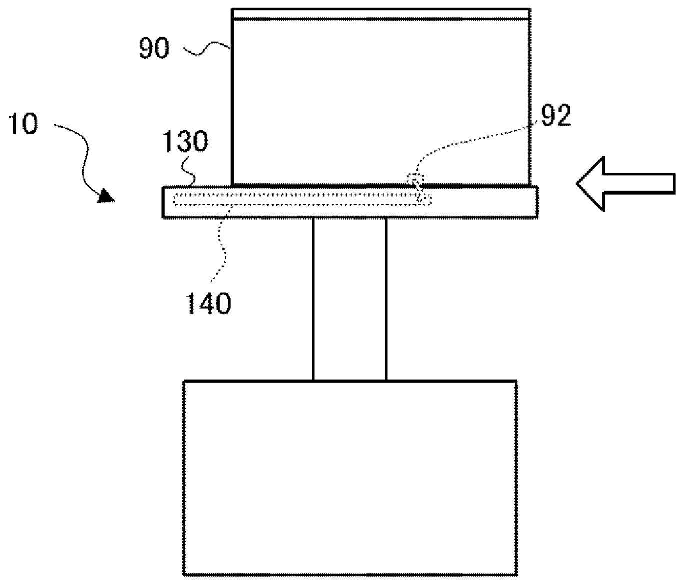
FIG. 14 is a schematic diagram showing the movement of the object originally stored into the rack through which the object is placed on the placement part.

Next, as shown in FIGS. 13 and 14, the control unit 100 returns the tip (the ratchet claw 142*b*) of the arm 140 toward the placement part 130. At this time, the ratchet claw 142*b* is hooked in the engagement part 92 (see FIG. 13). Then, when the ratchet claw 142*b* is hooked in the engagement part

92, the object 90 is pulled out from the rack 80 in accordance with the movement of the arm 140, and moved from the rack 80 onto the placement part 130 (see FIG. 14). As described above, in this embodiment, the ratchet claw 142 is engaged with the engagement part 92 of the object 90 simply by moving the arm 140. Therefore, the object 90 can be easily moved without the need for a precise alignment control for engaging the arm 140 with the object 90.

Further, the control unit 100 stores the object 90 placed on the placement part 130 into the rack 80 by performing control that is the reverse of the above-described control. That is, the control unit 100 can store the object 90 placed on the placement part 130 into the rack 80 by moving the tip of the arm 140 hooked in the engagement part 92 of the object 90 placed on the placement part 130 toward the rack 80, i.e., by extending the arm 140 from the placement part 130 by a predetermined length while keeping the ratchet claw 142*a* hooked in the engagement part 92. In this case, like in the above case, the ratchet claw 142*a* is engaged with the engagement part 92 of the object 90 simply by moving the arm 140. Therefore, the object 90 can be easily moved without the need for a precise alignment control for engaging the arm 140 with the object 90. Note that, prior to moving the arm 140, the control unit 100 rotates the shaft part 141 of the arm 140 so that the ratchet claw 142*a*, the claw tip 143*a* of which faces the front of the arm 140, faces upward.

Note that when an object is moved between the placement part 130 and the rack 80, the height of the placement part 130 has already been adjusted to a height suitable for the movement of the object. That is, the control unit 100 performs control in advance so that the placement part 130 is positioned at a predetermined height. Specifically, the control unit 100 controls the height of the placement part 130 so that it corresponds to the height at a position where the object to be moved is stored in the rack 80. That is, when the object 90 is moved from the rack 80 to the placement part 130, the control unit 100 adjusts the height of the placement part 130 so that the height of the upper surface of the placement part 130 corresponds to (i.e., the height of the upper surface of the placement part 130 is the same as) the height of the bottom surface of the object 90 in a state in which it is stored in the rack 80. Further, when the object 90 is moved from the placement part 130 to the rack 80, the control unit 100 adjusts the height of the placement part 130 so that the heights of the flanges 91 of the object 90 on the placement part 130 correspond to the heights of the rails 81*a* and 81*b*.

As described above, a plurality of engagement parts 92 of the object 90 may be formed. That is, a plurality of engagement parts 92, which are arranged in the direction in which the object 90 is moved in the rack 80, may be formed in the object 90. In this case, the object 90 can be moved under the following control by the control unit 100. In a case in which the object 90 stored in the rack 80 is moved to the placement part 130, the control unit 100 may rotate the arm 140 so that the ratchet claw 142*b* faces upward and then repeat control for extending the arm 140 from the placement part 130 and control for returning the arm 140 in the placement part 130. By doing so, the object 90 is gradually pulled out of the rack 80 using the plurality of engagement parts 92 in turn. Similarly, in a case in which the object 90 on the placement part 130 is moved to the rack 80, the control unit 100 may rotate the arm 140 so that the ratchet claw 142*a* faces upward and then repeat control for moving the arm 140 in a direction in which the arm 140 is retracted to the placement part 130 and control for extending the arm 140 from the placement part 130. By doing so, the object 90 is gradually pushed into the rack 80 using the plurality of engagement parts 92 in turn.

Figure 15:
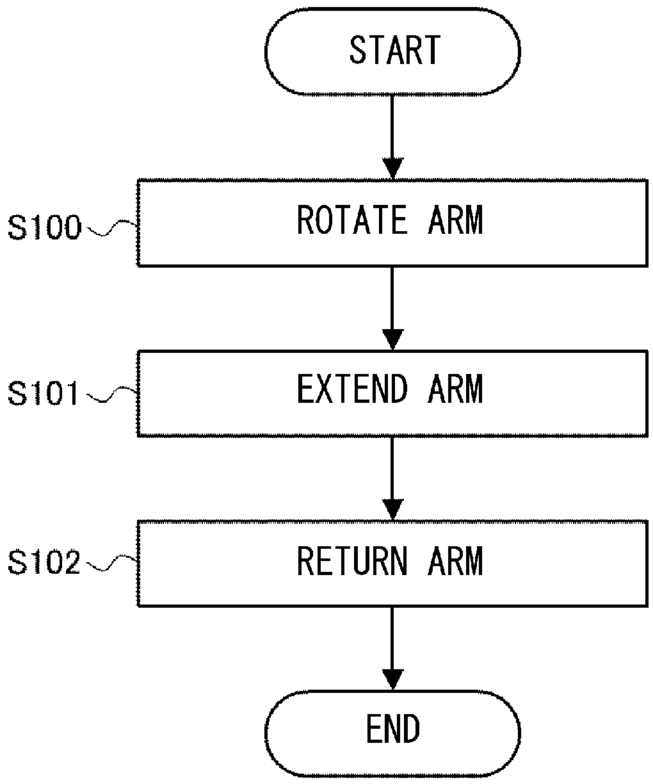
FIG. 15 is a flowchart showing an example of a flow of movements of an object from a rack to a placement part by an autonomous mobile robot according to the embodiment.

FIG. 15 is a flowchart showing an example of a flow of movements of the object 90 from the rack 80 onto the placement part 130 by the autonomous mobile robot 10. Note that it is assumed that the autonomous mobile robot 10 has already moved to a predetermined position in front of the rack 80.

In Step S100, the control unit 100 rotates the shaft part 141 of the arm 140 so that the ratchet claw 142*b* faces upward.

Next, in Step S101, the control unit 100 extends the arm 140. By doing so, the ratchet claw 142*b* is moved to a position beyond the engagement part 92 or to a position of the engagement part 92.

Next, in Step S102, the control unit 100 returns the arm 140 (the ratchet claw 142*b*). At this time, the ratchet claw 142*b* is hooked in the engagement part 92, and the object 90 is moved onto the placement part 130 in accordance with the movement of the arm 140.

Through the above-described movements, the object 90 is moved from the rack 80 onto the placement part 130. However, in the case where a plurality of engagement parts 92 are formed in the bottom surface of the object as described above, the control unit 100 repeats the above-described operations from Step S101 to Step S102. After the object is placed on the placement part 130, the control unit 100 may control the moving part 110 so as to move to the destination.

Figure 16:
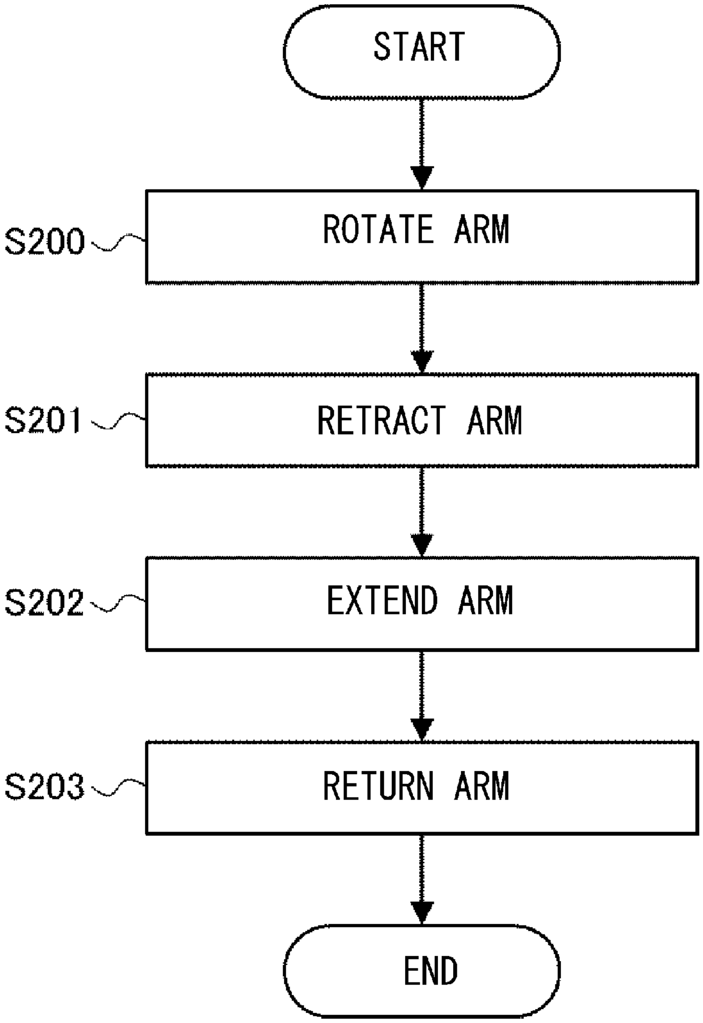
FIG. 16 is a flowchart showing an example of a flow of movements of an object from a placement part to a rack by the autonomous mobile robot according to the embodiment.

FIG. 16 is a flowchart showing an example of a flow of movements of the object 90 from the placement part 130 into the rack 80 by the autonomous mobile robot 10. Note that it is assumed that the autonomous mobile robot 10 has already moved to a predetermined position in front of the rack.

In Step S200, the control unit 100 rotates the shaft part 141 of the arm 140 so that the ratchet claw 142*a* faces upward.

Next, in Step S201, the control unit 100 moves the arm 140 (the ratchet claw 142*a*) in a direction in which it is retracted. By doing so, the ratchet claw 142*a* is moved to a position beyond the engagement part 92 or to a position of the engagement part 92.

Next, in Step S202, the control unit 100 extends the arm 140. At this time, the ratchet claw 142*a* is hooked in the engagement part 92, and the object 90 is moved to the rack 80 in accordance with the movement of the arm 140.

Next, in Step S203, the control unit 100 returns the arm 140 (the ratchet claw 142*a*). At this time, only the arm 140 is returned since the ratchet claw 142*a* is detached from the engagement part 92.

Through the above-described movements, the object 90 is moved from the placement part 130 into the rack 80. However, in the case where a plurality of engagement parts 92 are formed in the bottom surface of the object as described above, the control unit 100 repeats the above-described operations from Step S201 to Step S202.

An embodiment has been described so far. As described above, the autonomous mobile robot 10 according to this embodiment includes the arm 140 in which the ratchet claws 142 are provided. Therefore, the ratchet claw 142 is engaged with the engagement part 92 of the object 90 simply by moving the arm 140. Thus, according to this embodiment, the object 90 can be easily moved without the need for a precise alignment control for engaging the arm 140 with the object 90.

Note that the present disclosure is not limited to the above-described embodiment and may be changed as appropriate without departing from the spirit of the present disclosure. For example, in the above-described example, the engagement part 92 is formed in the bottom surface of the object 90, and the control unit 100 moves the arm 140 along the bottom surface of the object 90. However, the engagement part 92 may instead be formed in other surfaces (e.g., the side surface) of the object 90. In such a case, in order to engage the ratchet claw 142 with the engagement part 92, the control unit 100 only needs to move the arm 140 along the surface including the engagement part 92. Further, in the above-described example, the arm 140 includes the two ratchet claws 142, which enable an object to be moved in two directions. However, when it is only necessary to move an object in one of the two directions, the arm 140 may include only one ratchet claw 142.

From the disclosure thus described, it will be obvious that the embodiment of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance apparatus comprising:

an arm that is movable in a horizontal direction and rotatable, the arm comprising a first ratchet claw and a second ratchet claw spaced apart from the first ratchet claw in a circumferential direction of the arm; and a control unit configured to:

move the arm along a surface of an object, the surface comprising an engagement part; and rotate the arm in the circumferential direction of the arm to engage one of the first ratchet claw or the second ratchet claw with the engagement part.

2. The conveyance apparatus according to claim 1, wherein the first ratchet claw comprises a first claw tip facing a front of the arm, the second ratchet claw comprises a second claw tip facing a rear of the arm.

3. The conveyance apparatus according to claim 1, wherein the second ratchet claw is spaced apart by 90° from the first ratchet claw in the circumferential direction of the arm.

4. The conveyance apparatus according to claim 1, further comprising a placement part, wherein the arm extends from and retracts into the placement part in the horizontal direction.

5. The conveyance apparatus according to claim 4, wherein the arm is configured to move the object onto the placement part, and the placement part is configured to accommodate the object thereon.

6. The conveyance apparatus according to claim 4, wherein the control unit is further configured to move the placement part in a vertical direction.

7. The conveyance apparatus according to claim 4, wherein the placement part comprises a cut-out part that prevents the first ratchet claw and the second ratchet claw from colliding with the placement part.

8. The conveyance apparatus according to claim 1, further comprising:

a driving wheel configured to move the conveyance apparatus, wherein the control unit is further configured to control the driving wheel.

* * * * *